United States Patent
Osterloh et al.

(10) Patent No.: US 9,024,780 B2
(45) Date of Patent: May 5, 2015

(54) LIMITED DATA MESSAGING WITH STANDARDS COMPLIANCE

(75) Inventors: Christopher Lloyd Osterloh, Waseca, MN (US); James Patrick Ogle, Spokane, WA (US); Bret Gregory Holmdahl, Greenacres, WA (US)

(73) Assignee: Itron, Inc., Liberty Lake, WA (US)

( * ) Notice: Subject to any disclaimer, the term of this patent is extended or adjusted under 35 U.S.C. 154(b) by 400 days.

(21) Appl. No.: 13/464,622

(22) Filed: May 4, 2012

(65) Prior Publication Data

US 2013/0293391 A1 Nov. 7, 2013

(51) Int. Cl.
*G08C 15/06* (2006.01)
*G01D 4/00* (2006.01)

(52) U.S. Cl.
CPC .............. *G01D 4/002* (2013.01); *Y02B 90/241* (2013.01); *Y04S 20/32* (2013.01)

(58) Field of Classification Search
CPC ....................................................... G01D 4/002
USPC ............. 340/870.02, 870.03, 870.07, 286.01, 340/539.13, 539.22, 870.06; 703/2, 6; 705/1.1, 63, 304; 707/802, 956; 709/203, 223, 224
See application file for complete search history.

(56) References Cited

U.S. PATENT DOCUMENTS

| | | | |
|---|---|---|---|
| 4,817,131 A * | 3/1989 | Thornborough et al. | 379/106.04 |
| 7,298,259 B2 * | 11/2007 | Moriwaki | 340/539.22 |
| 7,403,114 B2 * | 7/2008 | Moriwaki | 340/539.22 |
| 7,605,698 B2 * | 10/2009 | Moriwaki | 340/539.22 |
| 8,170,886 B2 * | 5/2012 | Luff | 705/1.1 |
| 8,671,136 B2 * | 3/2014 | Moriwaki et al. | 709/203 |
| 2012/0026005 A1 | 2/2012 | Myoung et al. | |
| 2012/0083937 A1 | 4/2012 | Kong et al. | |
| 2012/0089523 A1 | 4/2012 | Hurri et al. | |
| 2012/0179477 A1 * | 7/2012 | Luff | 705/1.1 |

FOREIGN PATENT DOCUMENTS

KR 100980289 9/2010

OTHER PUBLICATIONS

The PCT Search Report and Written Opinion mailed Sep. 17, 2013 for PCT application No. PCT/US13/38491, 13 pages.
Struklec, "Implementing DLMS/COSEM in Smart Meters", 8th International Conference on the European Engery Market (EEM), IEEE, 2011, pp. 747-752.

* cited by examiner

*Primary Examiner* — Van T. Trieu
(74) *Attorney, Agent, or Firm* — Lee & Hayes, PLLC

(57) ABSTRACT

Techniques for limited data messaging with standards compliance are described herein. A network may be configured as an advanced metering infrastructure (AMI) for automatic meter reading (AMR). A plurality of endpoints (EP) may each be associated with a meter configured to measure consumption of a resource, such as electricity or natural gas. The plurality of EPs may communicate consumption data to a data collector (DC), which transfers the data to a central office. In one example, network traffic and battery power consumption of the EPs may be reduced if each endpoint packages data as a compact array, having minimal data formatting and tagging. A class object associated with each EP and stored at the DC allows the DC to interpret the compact array. Based on this interpretation, the DC is able to reformulate the data as a COSEM (or other standards-based object) for transmission to the central office.

20 Claims, 6 Drawing Sheets

LIMITED DATA MESSAGING WITH STANDARDS COMPLIANCE

BACKGROUND

Automatic meter reading (AMR) is a technology that supports the automatic collection of consumption, diagnostic and status data from meters, such as those associated with electrical, gas and water customers. AMR saves money by obviating the need to periodically manually read meters, and also allows consumables to be billed based in near real-time with respect to consumption.

Advanced metering infrastructure (AMI) provides a more advanced technology, including two-way communication between a data collector (e.g., a root node of a network or a cellular router, etc.) and a plurality of smart meters. Thus, smart meters potentially provide two-way communication from the location of the consumer to a head office of a utility company. Such connectivity is useful for many purposes, including billing issues, market-driven pricing based in part on time of day and peak loads, consumer education and feed-back, etc.

In the context of electrical power supply, AMR and AMI, together with other electrical grid elements, may constitute a smart grid. Within a smart grid, electrical consumption and supply may be based in part on a two-way flow of information about the behavior of suppliers and consumers. Such a smart grid infrastructure increases efficiency, reliability and stability, etc., of the electrical system. Accordingly, the smart grid is a fundamental re-engineering of the electrical supply industry and the customers it serves, the scope of which has and will result in a major investment in infrastructure.

As AMR, AMI and the smart grid have advanced, and more components have been added to the grid and associated network, considerable communication traffic has arisen. In particular, large numbers of communication devices are added to not only the electric grid infrastructure, but also to infrastructures providing natural gas, water and other consumables (e.g., heat, steam, etc.). The network traffic includes data packets that are transmitted and received by grid components according to one or more protocols and standards. The communication may be made over both wired (e.g., power line communication (PLC)) and non-wired (e.g., radio frequency (RF) transmissions) networks.

Due to the configuration of such networks, particularly including those supplying natural gas, many network devices are battery powered. The batteries powering such devices may be expected to have multi-year life times. However, the volume of data moving through the network may make network device design difficult. Additionally, many protocols and standards impose a heavy overhead to devices that communicate within AMR, AMI and smart grid environments. This volume of data, and associated overhead, may reduce the lifespan of battery powered devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
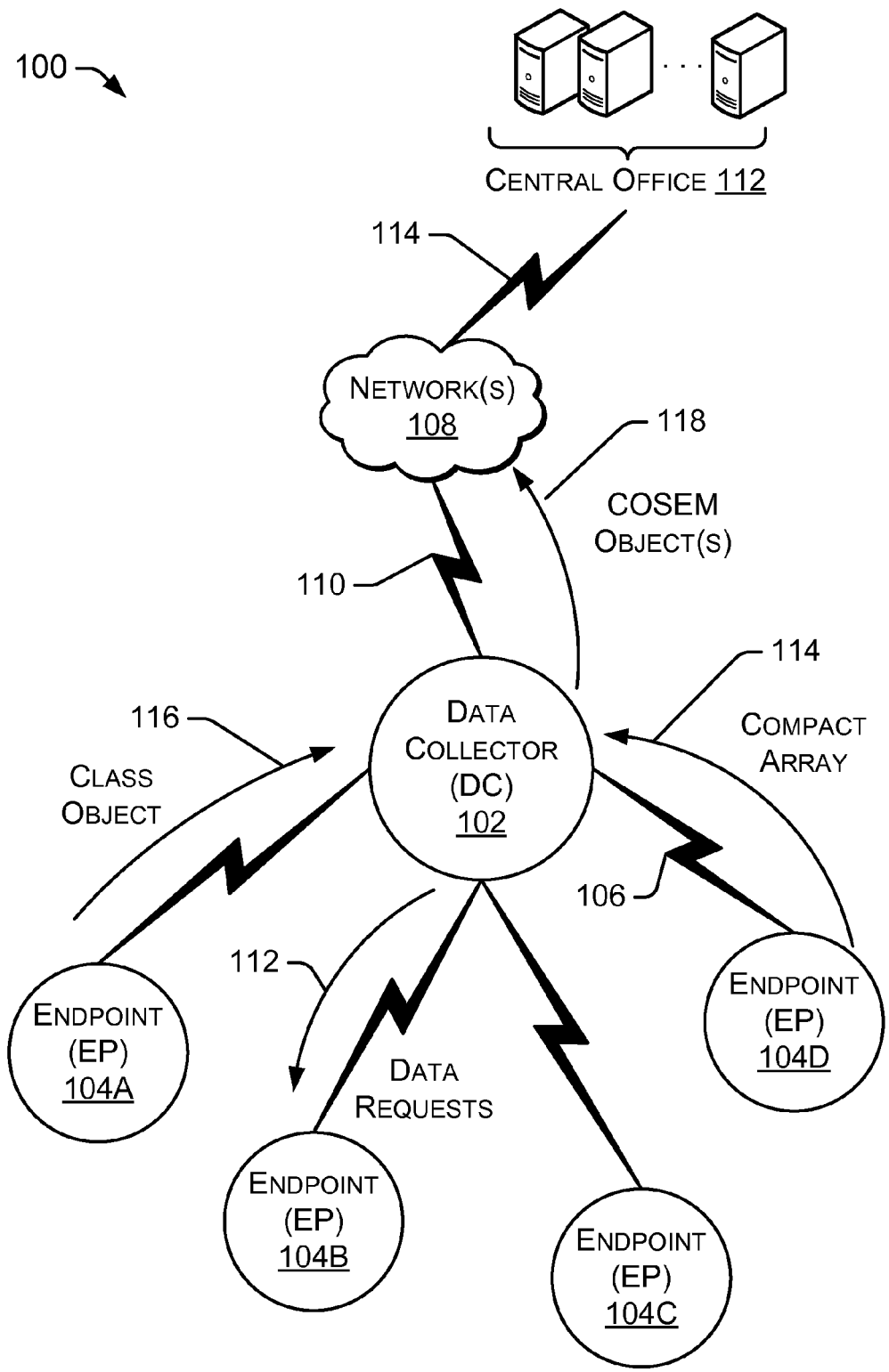
FIG. 1 is a diagram illustrating an example of a network configured for limited data messaging with standards compliance.

Representative examples to limit data messaging traffic while still maintaining standards compliance are discussed herein. In one example, within an advanced metering infrastructure (AMI), automatic meter reading (AMR) is a technology that supports the automatic collection of consumption, diagnostic and status data from meters, such as those associated with electrical, gas and water customers. In the context of electrical power supply, AMR and AMI, together with other electrical grid elements, may constitute a smart grid.

The AMI and smart grid environment include a number of standards, including a number related to data communication. One standard is DLMS/COSEM (Device Language Message Specification)/(COmpanion Specification for Energy Metering). Within such a standard, each COSEM object may be identified in part by a logical name given by an OBIS (Object Identification System) code. A number of OBIS codes are available to support particular needs. Advantageously, such standards allow disparate nodes or components to communicate. Unfortunately, such standards also add multiple layers of communications protocol to otherwise simple data transfers. Under such a burden, network traffic may double.

Such traffic increase is particularly burdensome on components within the AMI and/or smart grid that are battery powered and/or operating within a narrow bandwidth environment. Accordingly, conflicting design goals arise with respect to components that are battery powered and/or configured for operation in narrow bandwidth environments. Standards compliance is valuable, but reduced power consumption and reduced network traffic are also important goals. This disclosure describes techniques for providing a balance to these goals.

An example illustrating some of the techniques discussed herein—not to be considered a full or comprehensive discussion—may assist the reader. A plurality of endpoints (EP) may each be associated with a meter, which may measure electrical, gas and/or water consumption of a customer of a utility company. Each endpoint may be equipped with a radio for radio frequency (RF) communication and may be configured to transmit consumption data indicated by the associated meter to a data collector (DC) that may be in communication with a central office of the utility company.

In one example, the EP may transmit a class object to its respective DC. The class object may explain a profile of the EP and/or explain structural detail and operation of a compact array to be transmitted by the EP to the DC on a regular basis.

The class object may be transmitted once or as required to the DC, to reduce network traffic and battery consumption.

The EP may routinely transmit the compact array to the DC. The compact array may include data indicating (utility) resource consumption (e.g., electric or gas use) in a format that is compact with little formatting overhead. For example, data tags may not be present, and the data may be stated as efficiently as possible. For example, differential and/or incremental data may be used, rather than full meter reads. In a further example, data may be configured in a manner or format that is implicit, rather than expressly indicated by a conventional standard. The result is less network traffic and power consumption.

At the DC, the compact array may be received from an EP. The compact array may be associated with a periodic meter read or other event. A class object associated with the EP may be retrieved (e.g., from a library of such objects). The data in the compact array may be extracted, e.g., by using the class object to provide meaning to untagged data and/or un-segmented data. The DC is then able to create appropriate COSEM objects (and/or objects of other standards) from the extracted data. The COSEM objects may be relayed upstream to a central office or other administrative location for processing. Accordingly, the network traffic and battery consumption of endpoints is substantially reduced. Moreover, the consumption data originating at the EPs is transmitted upstream from the DC according to a desired standard (e.g., COSEM).

The discussion herein includes several sections. Each section is intended to be by way of example and non-limiting in nature. Accordingly, each section is intended to be an example of techniques and/or structures, but is not intended to indicate elements which must be used and/or performed. A section entitled "Example Network with Limited Data Messaging and Standards Compliance" discusses an example network, and aspects of the structure and operation of class objects and compact arrays. A section entitled "Example Data Collector" discusses example structure of a data collector. A section entitled "Example End Point" discusses example structure of an endpoint. A section entitled "Example Methods" discusses aspects of methods operational in devices including processors, memory devices, program statements, application specific integrated circuits (ASICs), etc. The section discusses example methods by which the data collector and endpoints of FIGS. 1-3 may be operated. A further section entitled "Example Compact Array" shows one example of the structure of a compact array usable by the data collector and/or endpoints of FIGS. 1-3.

This brief introduction is provided for the reader's convenience and is not intended to describe and/or limit the scope of the claims or any section of this disclosure.

Example Network with Limited Data Messaging and Standards Compliance

FIG. 1 is a diagram illustrating an example of a network or system 100 configured for standards compliance while using techniques to limit bandwidth use and conserve battery power of network devices. The network 100 may be configured as an advanced metering infrastructure (AMI) adapted for automated meter reading (AMR). The system 100 may have a narrow bandwidth capability, yet may be configured for standards compliance using techniques that limit data transmission over portions of the network by utilizing class objects and compact arrays to more efficiently utilize available bandwidth. The networked environment may include a "root" or data collector 102 and a plurality of endpoints or nodes 104A-104D (collectively referred to as nodes or endpoints 104).

The data collector 102 may communicate with the endpoints 104 over a common communication channel 106. The common communication channel 106 may utilize a radio frequency (RF) or a wired medium. A wired medium may include dedicated wiring, or may include power line communication (PLC), i.e., a data signal superimposed over an alternating current (AC) power distribution line. The data collector 102 may communicate with a network 108, such as the Internet, by a cellular link 110 or other connection. The network 108 may provide communication with a central office 112 over a back-haul network 114 or other connection.

In one example, traffic over the communication links 106 between EPs and the DC may be reduced by providing an extension or variation to standards such as DLMS/COSEM. Traffic of COSEM objects and/or other standards-compliant data over the links 106 may be somewhat altered to maintain standards compliance while greatly reducing bandwidth consumption and battery power use. Optionally, the DC 102 may provide a request 112 to one or more EPs. The request 112 may include a command to transmit consumption data (e.g., electric or gas usage) as measured by a meter associated with the EP. Alternatively, the EPs may periodically transmit consumption data unprompted by the DC.

Each endpoint 104 may read one or more meters or devices and obtain data for transmission to the DC 102. A transmission 114 of data may include either a compact array or raw data. The compact array and/or raw data may include data having little or no segmentation or tagging. The organization of the compact array may be contained in a data structure, object or other programming structure or device. In the example of FIG. 1, the class object 116 contains information that allows the DC 102 to interpret the data contained in the compact array.

At startup, or as needed, each EP 104 may send a transmission 116 of a class object to the DC 102. As will be discussed in greater detail infra, a class object may define and/or profile the EP 104. In one example, the class object may be configured to provide information for use (e.g., by the DC 102) in mapping or translating raw data and/or data organized in a compact array into a COSEM object. Thus, the class object may provide information about the organization of the raw data and/or compact array. The information may be used to configure the COSEM object 118, including tags not received with the compact array and/or raw data but which are indicated by the class object and may be required by the COSEM object. The COSEM object 118 may be transmitted through the network 108 to the central office.

Example Data Collector

Figure 2:
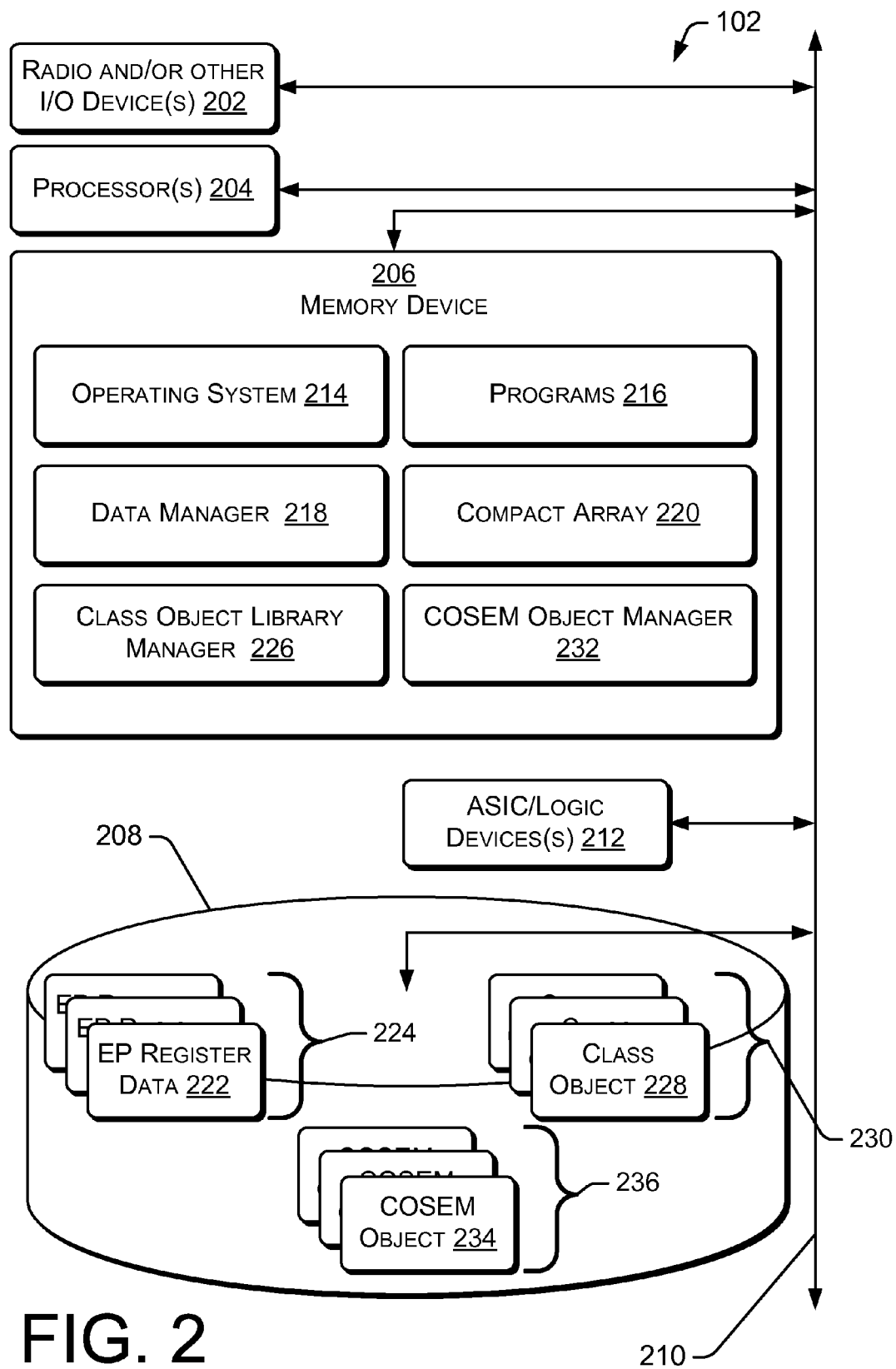
FIG. 2 is a block diagram illustrating an example data collector according to one embodiment described herein.

FIG. 2 illustrates is a diagram showing example details of a data collector (DC), such as the data collector 102 in FIG. 1. In the example of FIG. 2, the DC is configured for reducing bandwidth usage in a network (e.g., network 100 of FIG. 1) while maintaining standards compliance in an AMI/AMR environment. The data collector 102 may include a radio 202 and a processor(s) 204. The radio 202 may provide two-way radio frequency (RF) communication between the data collector 102 one or more endpoints (e.g., endpoints 104 in FIG. 2). The processor 204 may be in communication with a memory device 206 and/or disk 208 (or alternative memory device) over a bus 210 or similar communication path. The memory devices 206, 208 may include processor-readable instructions, which when executed by the processor 204 perform functions that may include some or all of the functions described herein. In a further example, all or part of the functionality of the processor 204 and processor-executable instructions defined in the memory devices 206, 208 may be performed by a hardware or logic device(s) 212, such as an application specific integrated circuit (ASIC), a gate array or other hardware-based logic device.

In the example data collector 102 of FIG. 2, the memory 206 may include software functionality configured as one or more "managers." However, such managers, modules or subroutines are intended to represent example divisions of the software for purposes of discussion, and are not intended to represent any type of requirement or required method, manner or necessary organization. Accordingly, while various "managers" are discussed, their functionality and/or similar functionality could be arranged differently (e.g., combined into a fewer number of modules, broken into a larger number of managers, etc.), as understood by those trained in the art. Additionally, the example data collector 102 may include an operating system 214 and other programs 216 as needed for operation.

A data manager 218 may be configured to receive, manage, store and transmit data received from one or more EPs 104. In one example, the data manager 218 may read and/or process raw data and/or data configured within a compact array 220 received from one or more endpoints 104. The data manager 218 may manage "meter reads" or "register reads" of the meter(s) associated with one or more endpoints. The data manager 218 may store the meter data associated with an EP in a data base or other data structure, such as EP register data 222. In one example, a library 224 of data records 222 may be maintained, wherein each data record may be associated with one of a plurality of EPs.

In a further example, the data manager 218 may process differential data provided by one or more EPs. The differential data may include information such as a "differential" or change to a consumption-measurement meter at an EP. For example, an EP may report the difference (the "differential") between a current and a previous read of an electricity or gas meter. Such a report or information may be a much more compact transmission than a report of full meter and/or full register read of a consumption meter on the endpoint. To maintain full knowledge of the meter activity, the data manager 218 may reconstruct and maintain the full meter and/or full register read of each meter in the network 100 in the library 224 of EP meter register data 222. Thus, the data manager 218 is configured to read, process and/or translate differential data obtained from an EP into a full register read associated with a particular endpoint. The differential data may be obtained from raw data and/or a compact array received from the EP.

A class object library manager 226 may be configured to receive, manage and/or store one or more class objects 228 sent by one or more EPs. If there is a plurality of EPs (e.g., EPs 104 in the network 100), a library 230 of class objects from the plurality of EPs may be maintained. Each class object 228 may be associated with the EP that sent the class object to the data collector 102. Each class object 228 may provide information needed to assist in the translation of raw data, such as data in a compact array 220, into a COSEM object.

A COSEM object manager 232 may be configured to create COSEM objects 234 according to data (e.g., obtained from a compact array 220) using a class object 228 from the class object library 230. If required, one or more COSEM objects may be stored in a library 236 for later use or transmission. Once created, the COSEM objects may be sent to a consumer of information contained within the objects, such as the central office 112 (as seen in FIG. 1).

Example Endpoint

Figure 3:
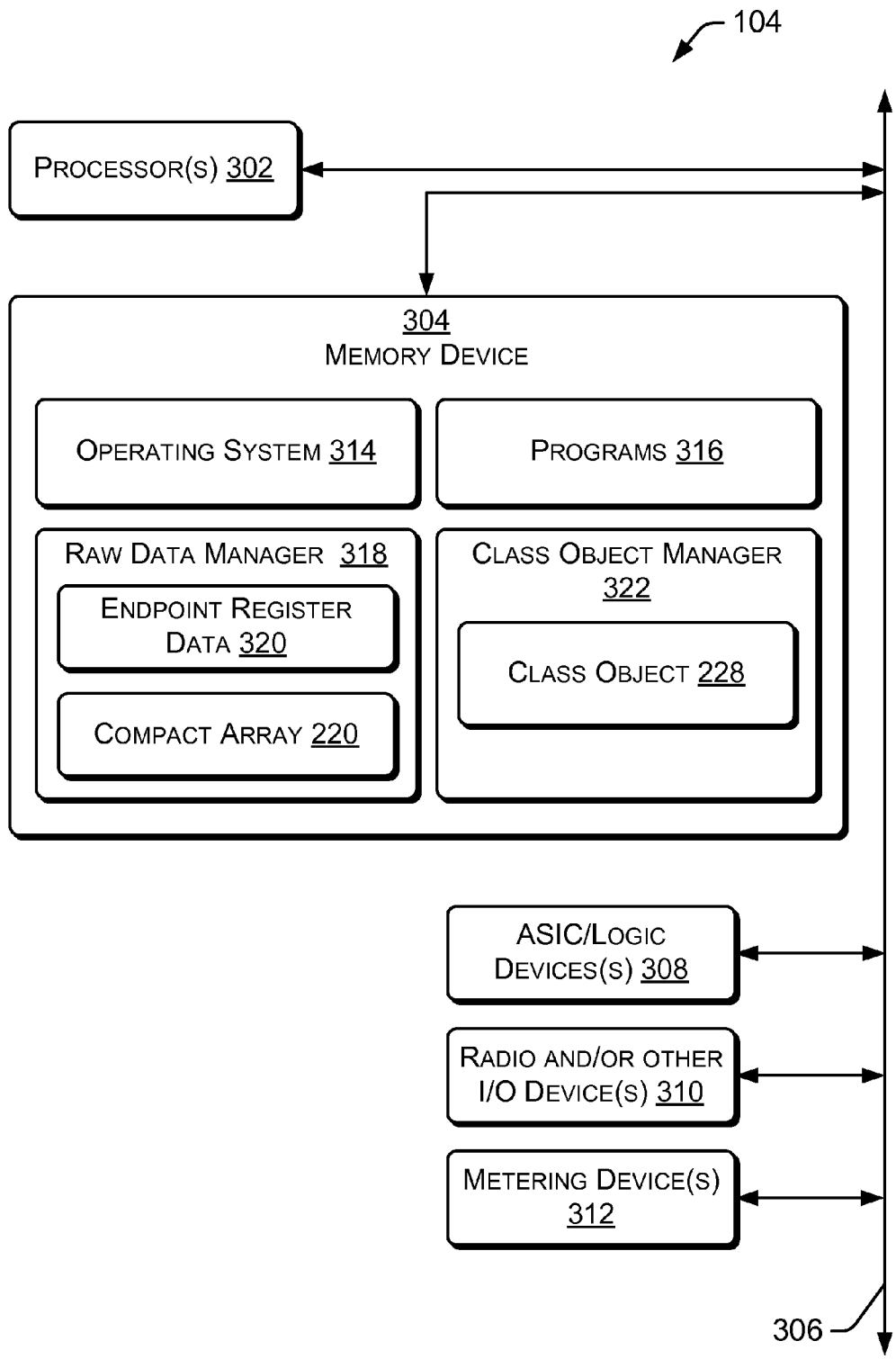
FIG. 3 is a block diagram illustrating an example endpoint according to one embodiment described herein.

FIG. 3 is a block diagram illustrating an example detail of an endpoint (EP), such as the EP 104 in of FIG. 1. In the example of FIG. 3, the EP is configured for reducing bandwidth usage and battery power usage in a network (e.g., network 100 of FIG. 1) while maintaining standards compliance in an AMI/AMR environment. The EP 104 may include a processor(s) 302 and memory device 304 in communication over a bus 306. In a manner similar to the DC 102 of FIG. 2, the memory device 304 may include processor-readable instructions, which when executed by the processor 302 perform functions that may include some or all of the functions described herein. In a further example, all or part of the functionality of the processor 302 and processor-executable instructions defined in the memory devices 304 may be performed by a hardware or logic device(s) 308, such as an application specific integrated circuit (ASIC), a gate array or other hardware-based logic device. The EP 104 may include one or more I/O devices, such as a radio 310. Additionally, the EP 104 may receive data from one or more metering devices 312 (e.g., electric or gas meters), which may be internal or external to the EP 104.

An operating system 314 and/or one or more programs 316 may provide functions related to the reading and processing of meter data generated by the metering device(s) 312.

As in the example of FIG. 2, the memory 304 may include software functionality configured as one or more "managers." As before, while various "managers" are discussed, their functionality and/or similar functionality could be arranged differently while still in keeping with the techniques of the disclosure.

A raw data manager 318 may be configured to receive data (e.g., endpoint register data 320) from the metering device(s) 312. The data obtained from the metering device(s) 312 may be considered "raw," in that it is unprocessed. In one example, the raw data manager 318 obtains data from the metering device(s) periodically, in an automatic manner. In another example, the raw data manager 318 obtains the data in response to a command received (e.g., data request command 110 of FIG. 1, via radio or I/O device 310) from a data collector (e.g., DC 102 of FIGS. 1 and/or 2). The raw data manager 318 may be configured to process the meter data stored in endpoint register data 320 to create a compact array 220 for transmission to a data collector (e.g., data collector 102 of FIGS. 1 and 2). In one example, data from the endpoint register data 320 may be reformatted—such as by ordering the data and/or removing tags and other overhead—to create the compact array 220. The compact array 220 may also be considered to be "raw" data, because while processed from the endpoint register data, it has been processed to generally remove formatting and tags, and not to add such overhead.

A class object manager 322 may be configured to send a class object 228 to the data collector (e.g., DC 102 of FIGS. 1 and 2). The class object manager 322 may send the class object 228 when the EP 104 starts up and/or is installed, or at other times as needed or requested by the DC. The class object 228 may be configured specifically for the EP 104 and/or for a class or group of endpoints having similar characteristics.

Example Methods

The example methods of FIGS. 4-7 may be implemented at least in part by the example configurations of FIGS. 1-3. However, FIGS. 4-7 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof.

In the context of software, the operations represent computer-executable instructions stored on one or more computer-readable storage media (e.g., media 206, 304) that, when executed by one or more processors (e.g., processor 204, 302), perform the recited operations. The computer- and/or processor-readable storage media may be non-transitory and/or "persistent" in design and operation. The storage media seen in FIGS. 2 and 3 are representative of storage media generally, both removable and non-removable, and of any technology. Thus, the recited operations represent actions, such as those described in FIGS. 4-7, and may be taken under control of one or more processors configured with executable instructions to perform the actions indicated. Additionally, the order in which the operations are described is not intended to be construed as a limitation, and the described operations may be combined in different orders and/or in parallel to implement the method. And further, the above discussion may apply to other methods described herein.

Additionally, for purposes herein, computer-readable media may include all or part of an application specific integrated circuit (ASIC) or other hardware device. Such a hardware device may be configured to include other functionality, including functions involving firmware update within a wireless network. Accordingly, such an integrated circuit may provide the same functionality as processors and memory configured with executable instructions, and may be defined by logic, transistors or other components.

Figure 4:
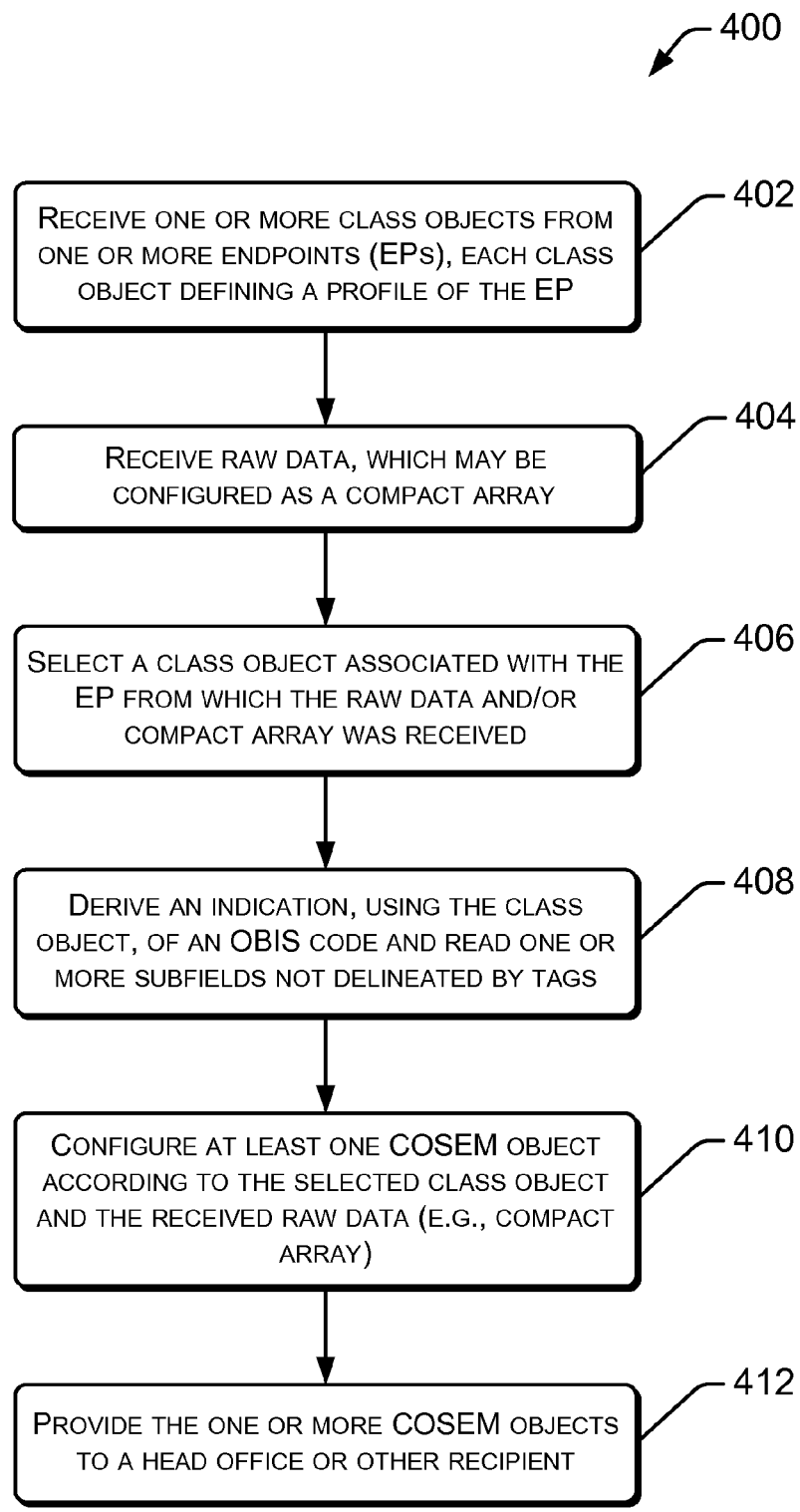
FIG. 4 is a flow diagram illustrating an example process for operation of the data collector of FIGS. 1 and/or 2.

FIG. 4 is a flow diagram illustrating an example operating process 400 for the data collector 102 of FIGS. 1 and/or 2. In one example of data collector operation, a DC receives a class object from an EP upon installation of the EP or otherwise, as needed. At regular intervals, or in response to commands from the DC, the DC may receive—from each EP—raw data and/or a compact array including data with low overhead (e.g., minimal tagging, formatting, etc.). The DC may use the class object to interpret and process the data (e.g., the compact array) and to thereby derive OBIS code(s), data and information. The DC may create, by using the class object, one or more COSEM objects that include the received data, and may transmit them to a central office or other location.

At operation 402, one or more class objects are received at the DC. Each class object may be from a different EP, and may define a profile of that EP. In the context of the example of FIG. 2, the class object library manager 226 may receive and process one or more class objects 228, which may be stored in the library 230.

At operation 404, raw data is received at the DC from an EP. In the context of the example of FIG. 2, the data manager 218 may receive a compact array 220 from the EP 104 (see FIG. 1). In an alternative example, the data may be configured as raw data in an alternate format.

At operation 406, the DC selects a class object that is associated with the endpoint from which the data was received. In the context of the example of FIG. 2, the class object library manager 226 selects an appropriate class object from the library 230 of class objects.

At operation 408, the received data (e.g., compact array 220) are interpreted using the class object to understand the arrangement of the data. Thus, an indication of an OBIS code may be discovered and/or one or more fields or subfields are read. Using the class object, the meaning of data within the compact array may be fully understood. In the context of the example of FIG. 2, the data manager 218 may use an appropriate class object (e.g., class object 228) to interpret the data in the compact array 220. Once the data from the compact array is interpreted, the data manager 218 may store the data in an EP register data record 222 associated with the EP from which the data was sent.

At operation 410, a COSEM object is configured according to the selected class object and the received raw data (e.g., compact array). In the context of the example of FIG. 2, the COSEM object manager 232 may configure a COSEM object 234 using the compact array 220 received from the EP and the class object 228 associated with that EP.

At operation 412, the COSEM object may be sent to a central office or other intended recipient. In the context of the example of FIG. 2, the COSEM object manager 232 may send the COSEM object to the central office 112 (FIG. 1).

Figure 5:
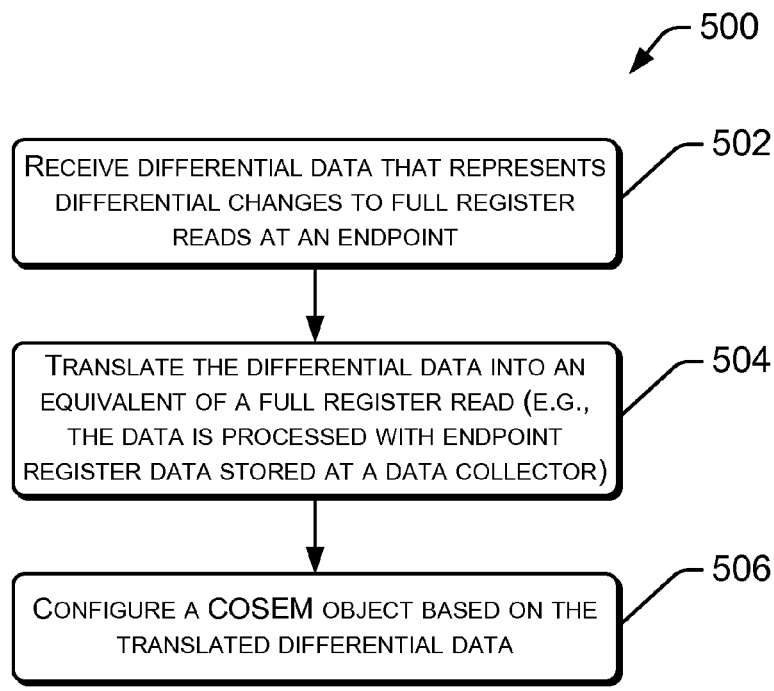
FIG. 5 is a flow diagram illustrating an example of how differential data may be used to lessen network traffic and/or conserve battery power in one or more network devices.

FIG. 5 is a flow diagram illustrating an example of how differential data may be used to lessen network traffic and/or conserve battery power in one or more network devices. In one example, differential data may be used to represent utility consumption. Advantageously, it may involve less network traffic for an EP to report that, for example, an additional 50 KWH were consumed by a customer and recorded by a meter than to report a total amount of electricity consumed and indicated on the meter. In another example, the DC may assume all or part of the responsibility of accounting for total consumption for each EP by recording a series of differential and/or incremental meter readings in a record of a database.

At operation 502, differential data is received at the DC that represents changes to full register reads at an endpoint. Thus, an EP may read a register, but to avoid sending the entire register reading, sends only a differential and/or change from a last reading. This could result in transmission of less data over the network.

At operation 504, the differential data is translated into an equivalent of a full register read. Thus, the differential data received from an endpoint updates previously processed data associated with that endpoint. Accordingly, the DC maintains a record of the readings of the meter by adjusting previous meter information with incremental or differential data. In the context of the example of FIG. 3, the raw data manager 318 of the EP may communicate with the metering devices 312, and obtain a meter read. This may result in changes to the endpoint register data 320 of the EP. The raw data manager 318 at the EP may process the data to include differential or incremental data in the compact array 220. The compact array is then sent to the DC. Referring to the example DC seen in FIG. 2, the data manager 218 may receive the compact array 220, and interpret the data therein in part by use of an appropriate class object. Having interpreted the data, the DC may then use the data to update a respective EP register 222 in the library 224. This provides a record of the consumption associated with each EP at the DC.

At operation 506, a COSEM object is configured based on the translated, processed and/or interpreted differential data. Referring to the example of FIG. 2, the COSEM object manager 232 at the DC may configure a COSEM object 234 to transmit data associated with the EP to a central office. Using the differential data received and previous data received, the data manager 218 is able to assemble a full meter read from the EP register 222 of the respective EP. This data may be used by the COSEM object manager 232 to create a COSEM object 234, which may be transmitted to a central office.

Figure 6:
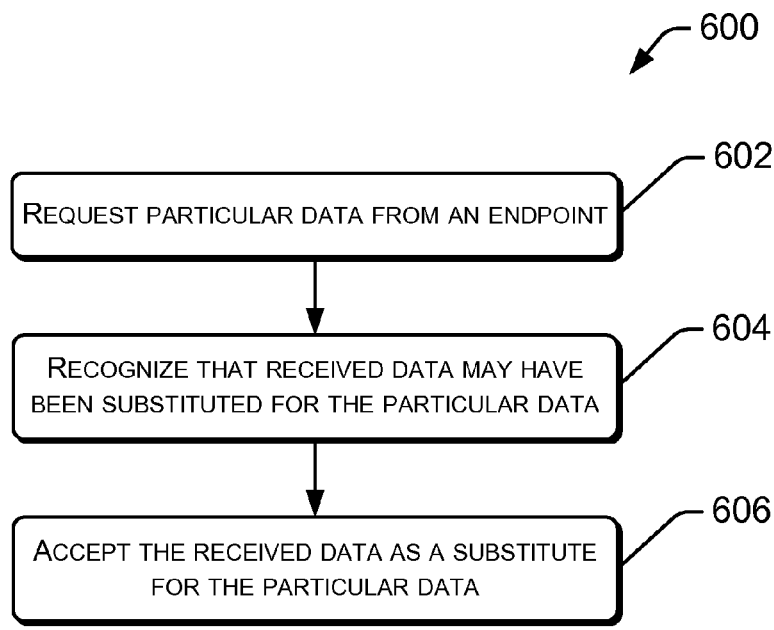
FIG. 6 is a flow diagram illustrating an example of how substitute data may be accepted as a technique to lessen network traffic and/or conserve battery power in one or more network devices.

FIG. 6 is a flow diagram illustrating an example operating process 600 for lessening network traffic. In one example, a DC may request particular data from an EP. However, the EP may be programmed and/or configured to transmit substituted or different data. The substituted data may result in less network traffic. The DC accepts the substituted data as a technique to lessen network traffic and/or conserve battery power in one or more network devices.

At operation 602, a DC requests particular data from an endpoint. In one example, the DC may request a full meter read. However, the EP may send a differential data read, which shows only changes in the meter, not the entire meter read. This saves network bandwidth and battery power for some EPs. At operation 604, the DC recognizes that the data it has received is substituted for the particular data which was requested. For example, the DC recognizes that the EP has sent data that is more compact. At operation 606, the DC accepts the received data from the EP. For example, differential data could be accepted. The overhead of maintaining the complete meter read could be performed by the DC, which could assemble a series of differential reads to track the full meter read.

Figure 7:
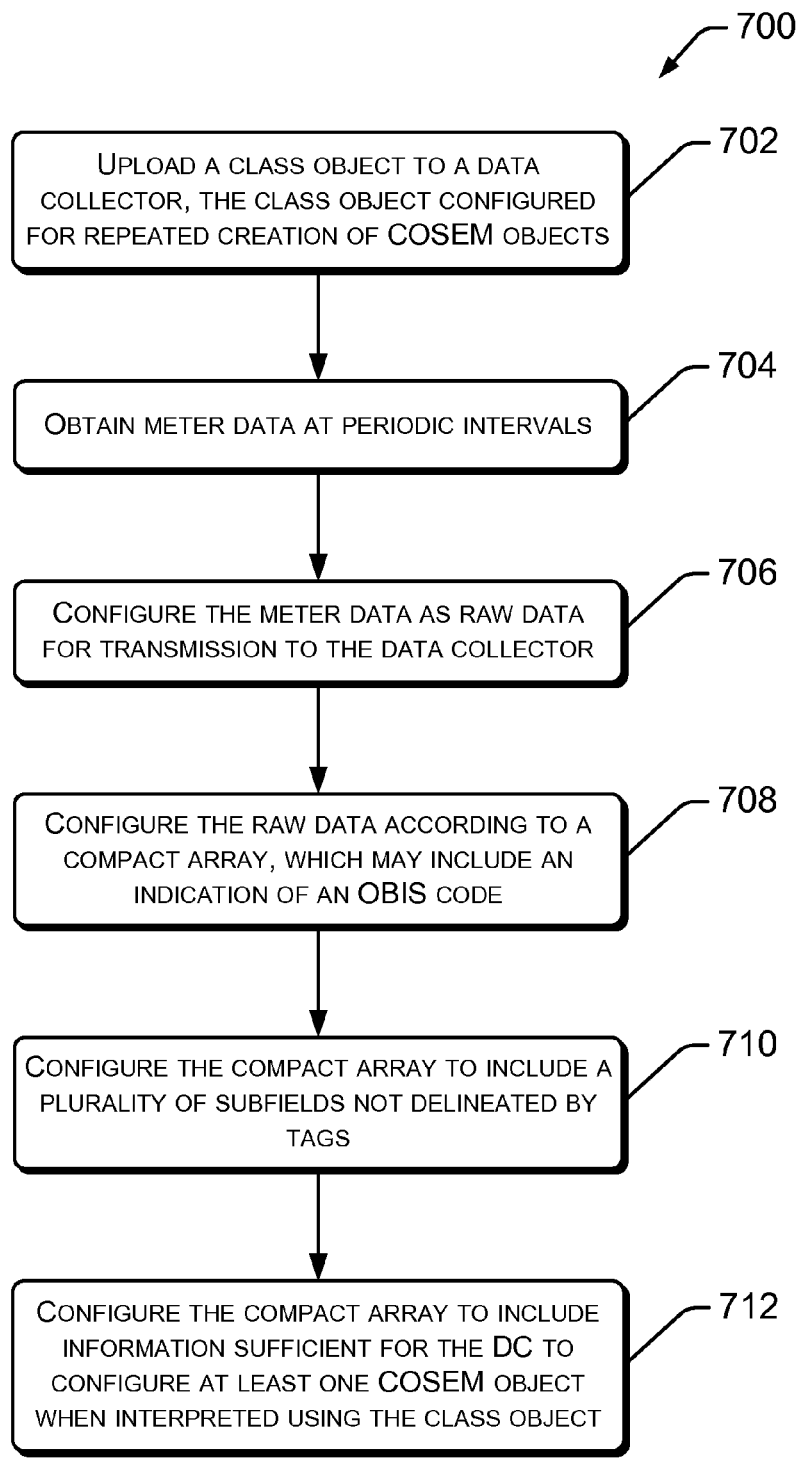
FIG. 7 is a flow diagram illustrating an example process for operation of the endpoint of FIGS. 1 and/or 3.

FIG. 7 is a flow diagram illustrating an example operating process 700 for the endpoint of FIGS. 1 and/or 3. In one example, an EP sends a class object to a DC, where it is stored. At intervals, the EP configures meter data in a format with little overhead (e.g., data tagging, metadata, etc.), such as a compact array, for transmission to the DC. In one example, the compact array and the class object are configured to allow construction of a COSEM object at the DC.

At operation 702, a class object is uploaded from an EP to a DC. In the context of the example of FIG. 3, the class object manager 322 may upload the class object 228 to the class object library manager 232 of the DC. In the context of the example of FIG. 2, the class object library manager 232 may store the class object in a library 230.

At operation 704, the EP obtains meter data at intervals of time. In the context of the example of FIG. 3, the raw data manager 318 may obtain endpoint register data 320 from one or more metering devices 312 according to a schedule or upon request by the DC.

At operation 706, the meter data is configured as raw data for transmission to the DC. In one example, at operation 708 the raw data is configured according to a compact array. The compact array may include an indication of an OBIS code. In the context of the example of FIG. 3, the raw data manager 318 may configure a compact array 220 according to data obtained from endpoint register data 320, obtained from metering devices 312. In the example of operation 710, the compact array is configured with a plurality of fields or subfields that are not delineated by tags.

At operation 712, the compact array is configured with sufficient information to allow the DC, using a class object, to create a COSEM object. In the example of FIG. 2, the COSEM object manager 232 is able to create a COSEM object 234 from data in the compact array 220 using the class object 228 (e.g., selected from library 230) that is associated with the EP that created the compact array.

Example Compact Array

Examples of compact arrays are seen below. The examples are intended to be representative, but not exhaustive. Additional examples could be created by those trained in the art.

Daily Consumption Message - Uplink

| D | Field | Bytes | Notes |
|---|---|---|---|
| | COSEM OBIS Code | | standardized OBIS identifier |
| | Message Timestamp | | Date/Time of the metering point at the time of message transmission |
| | Security Field | | Secure Authentication Data |
| | Fraud Detection | | Reserve 8 bits for tamper/events |
| | Status | | Reserve 8 bits for additional status |
| | Daily Consumption end hour | | Date/Time of daily consumption meter read. Elapsed gas day time. |
| | Consumption Register | | 4 bytes cubic meter; 2 byte liter |
| | 3 days Daily Consumption | 8 | Current and 2 previous daily consumption values for additional temporal redundancy. |
| | Total Application Data Payload | 2 | |
| | W-Mbus frame overhead | 5 | |
| Total LAN Packet Length | | 7 | |

Hourly Interval Message (transmitted in lieu of Daily Consumption Message if hourly interval is enabled) - Uplink

| D | Field | Bytes | Notes |
|---|---|---|---|
| | COSEM OBIS Code | | standardized OBIS identifier |
| | Message Timestamp | | Date/Time of the metering point at the time of message transmission |
| | Security Field | | Secure Authentication Data |
| | Fraud Detection | | Reserve 8 bits for tamper/events |
| | Status | | Reserve 8 bits for additional status |
| | Daily Consumption end hour | | Time of daily consumption meter read. w-mbus coding (Type F) |
| | Consumption Register | | 4 bytes cubic meter; 2 byte liter |
| | 24 hourly interval deltas | 8 | Represented by the use of deltas (2 bytes) from the consumption register value. Intervals aligned with the gas day hour. |
| | Total Application Data Payload | 2 | |
| | W-Mbus frame overhead | 9 | |
| Total LAN Packet Length | | 01 | |

15 Minute Interval Message (Special case as per SOL-FONC081 0.5% of population transmitted in lieu of the Daily consumption message if 15 minute intervals are selected) - Uplink

| D | Field | Bytes | Notes |
|---|---|---|---|
| | COSEM OBIS Code | | standardized OBIS identifier |
| | Message Timestamp | | Date/Time of the metering point at the time of message transmission |
| | Security Field | | Secure Authentication Data |
| | Fraud Detection | | Reserve 8 bits for tamper/events |
| | Status | | Reserve 8 bits for additional status |
| | Daily Consumption end hour | | Time of daily consumption meter read. w-mbus coding (Type F) |
| | Consumption Register | | 4 bytes cubic meter; 2 byte liter |
| | Data Set Indication | .5 | Indiciton of which 24 element block is beign transmitted |
| | 24 quarter-hour interval deltas | 8 | Represented by the use of deltas (2 bytes) from the consumption register value. All Intervals aligned with the gas day hour. The 96 daily values will be sent in four groups of 24 throughout the day in a rotating fashion. Set {1, 2, 3, 4} during the first 5 hour block, then repeating the complete set again in each of the next 3 reporting blocks. |
| | Total Application Data Payload | 2.5 | |
| | W-Mbus frame overhead | 9 | |
| Total LAN Packet Length | | 01.5 | 4 sets of this message per day at 4 messages per set. |

Meter Information Message - Uplink

| D | Field | Bytes | Notes |
|---|---|---|---|
| | COSEM OBIS Code | | standardized OBIS identifier |
| | Message Timestamp | | Time of the message transmission. Assume w-mbus coding. |
| | Security Field | | Secure Authentication Data |
| | Avg signal level from received cmd for DC 1 | | Average RSSI from the Primary DC |
| | Avg signal level from received cmd for DC 2 | | Average RSSI from the Secondary DC |
| | Avg signal level from received cmd for DC 3 | | Average RSSI from the Tertiary DC |
| | DC ID #1 | | ID of the Primary DC |
| | DC ID #2 | | ID of the Secondary DC |
| | DC ID #3 | | ID of the Tertiary DC |

Meter Information Message - Uplink

| D | Field | Bytes | Notes |
|---|---|---|---|
| 0 | Hardware revision | | Hardware revisions on the wireless module |
| 1 | "C" firmware version | | Firmware version of the wireless module |
| 2 | "M" firmware version | | Firmware version of the metering point (metrology) |
| 3 | Year of Manufacturer | | Year the hardware was manufactured |
| 4 | Certificate Date | | expiration date of the certificate |
| 5 | Extended diagnostic information | | Special status and condition codes. |
| | Total Application Data Payload | 4 | |
| | W-Mbus frame overhead | 3 | |
| | Total LAN Packet Length | 7 | |

Key Exchange Command - Downlink

| D | Field | Bytes | Notes |
|---|---|---|---|
| | COSEM OBIS Code | | standardized OBIS identifier |
| | Message Timestamp | | Time of the message transmission. |
| | Security Field | | Secure Authentication Data |
| | Reading Key | 6 | New reading key - 128 Bit AES |
| | Command Key | 6 | New command key - 128 Bit AES |
| | Recovery Key | 6 | New Recovery key - 128 Bit AES |
| | Key Index | | Index of the Reading, Command, and Recovery keys. 1 byte each. |
| | Tracking ID | | Tracking ID for replay attack prevention. |
| | Total Application Data Payload | 7 | |
| | W-Mbus frame overhead | 9 | |
| | Total LAN Packet Length | 6 | |

Programming/Configuration Command - Downlink

| D | Field | Bytes | Notes |
|---|---|---|---|
| | COSEM OBIS Code | | standardized OBIS identifier |
| | Message Timestamp | | Time of the message transmission. |
| | Security Field | | Secure Authentication Data |
| | Number of Commands | | Number of commands to follow (1 to 9) |
| | Command 1 | | Specific Command Identifier |
| | Command 1 Data | | 4 Byte data field for the preceding command identifier |
| | Command 2 | | Specific Command Identifier |
| | Command 2 Data | | 4 Byte data field for the preceding command identifier |
| | Command 3 | | Specific Command Identifier |
| 0 | Command 3 Data | | 4 Byte data field for the preceding command identifier |
| 1 | Command 4 | | Specific Command Identifier |
| 2 | Command 4 Data | | 4 Byte data field for the preceding command identifier |
| 3 | Command 5 | | Specific Command Identifier |
| 4 | Command 5 Data | | 4 Byte data field for the preceding command identifier |
| 5 | Command 6 | | Specific Command Identifier |
| 6 | Command 6 Data | | 4 Byte data field for the preceding command identifier |
| 5 | Command 7 | | Specific Command Identifier |
| 6 | Command 7 Data | | 4 Byte data field for the preceding command identifier |
| 5 | Command 8 | | Specific Command Identifier |
| 6 | Command 8 Data | | 4 Byte data field for the preceding command identifier |
| 5 | Command 9 | | Specific Command Identifier |
| 6 | Command 9 Data | | 4 Byte data field for the preceding command identifier |
| 7 | Tracking ID | | Tracking ID for replay attack prevention. |
| | Total Application Data Payload | 1 | |
| | W-Mbus frame overhead | 9 | |
| | Total LAN Packet Length | 00 | |

Programming/Configuration Command - Time set Example - Downlink

| D | Field | Bytes | Notes |
|---|---|---|---|
| | COSEM OBIS Code | | standardized OBIS identifier |
| | Message Timestamp | | Time of the message transmission. |
| | Security Field | | Secure Authentication Data |
| | Number of Commands | | Number of commands to follow = 1 |
| | Command 1 | | Time set = 13081 |
| | Command 1 Data | | 4 Byte time delta from UTC. |
| | Tracking ID | | Tracking ID for replay attack prevention. |
| | Total Application Data Payload | 3 | |
| | W-Mbus frame overhead | 3 | |
| | Total LAN Packet Length | 6 | |

Firmware Download Block - Downlink

| D | Field | Bytes | Notes |
|---|---|---|---|
| | COSEM OBIS Code | | standardized OBIS identifier |
| | Message Timestamp | | Time of the message transmission. |
| | Security Field | | Secure Authentication Data |
| | Total Packets in Download | | Total Number of Packets in the entire firmware image |
| | Packet Number | | Specific Packet number in the download |
| | FW Block | 00 | 100 Byte block of the firmware image. |
| | Tracking ID | | Tracking ID for replay attack prevention. |
| | Total Application Data Payload | 20 | |
| | W-Mbus frame overhead | 5 | |
| | Total LAN Packet Length | 55 | |

Daily Consumption Message - Uplink

| D | Field | Bytes | Notes |
|---|---|---|---|
| | COSEM OBIS Code | | standardized OBIS identifier |
| | ID of wireless transmitter | | Based on W-Mbus standard address |
| | Message Timestamp | | Date/Time of the metering point at the time of message transmission |
| | Fraud Detection | | Reserve 8 bits for tamper/events |
| | Status | | Reserve 8 bits for additional status |
| | Daily Consumption end hour | | Date/Time of daily consumption meter read. Elapsed gas day time. |

-continued

Daily Consumption Message - Uplink

| D | Field | Bytes | Notes |
|---|---|---|---|
|  | Daily Consumption |  | 4 bytes cubic meter; 2 byte liter |
|  | History previous 3 days Daily Consumption | 8 | 3 previous daily reads for additional temporal redundancy. |
|  | Payload adder per wireless transmitter | 6 |  |

Hourly Interval Message (transmitted in lieu of Daily Consumption Message if hourly interval is enabled) - Uplink

| D | Field | Bytes | Notes |
|---|---|---|---|
|  | COSEM OBIS Code |  | standardized OBIS identifier |
|  | ID of wireless transmitter |  | Based on W-Mbus standard address |
|  | Message Timestamp |  | Date/Time of the metering point at the time of message transmission |
|  | Fraud Detection |  | Reserve 8 bits for tamper/events |
|  | Status |  | Reserve 8 bits for additional status |
|  | Daily Consumption end hour |  | Time of daily consumption meter read. w-mbus coding (Type F) |
|  | Daily Consumption |  | 4 bytes cubic meter; 2 byte liter |
|  | 24 hourly interval deltas | 8 | Represented by the use of deltas (2 bytes) from the daily consumption value. Intervals aligned with the gas day hour. |
|  | Payload adder per wireless transmitter | 6 |  |

15 Minute Interval Message (Special case as per SOL-FONC081 0.5% of population) - Uplink

| D | Field | Bytes | Notes |
|---|---|---|---|
|  | COSEM OBIS Code |  | standardized OBIS identifier |
|  | ID of wireless transmitter |  | Based on W-Mbus standard address |
|  | Message Timestamp |  | Date/Time of the metering point at the time of message transmission |
|  | Fraud Detection |  | Reserve 8 bits for tamper/events |
|  | Status |  | Reserve 8 bits for additional status |
|  | Daily Consumption end hour |  | Time of daily consumption meter read. w-mbus coding (Type F) |
|  | Daily Consumption |  | 4 bytes cubic meter; 2 byte liter |
|  | 24 quarter-hour interval deltas | 8 | Represented by the use of deltas (2 bytes) from the daily consumption value. All Intervals aligned with the gas day hour. |

-continued

15 Minute Interval Message (Special case as per SOL-FONC081 0.5% of population) - Uplink

| D | Field | Bytes | Notes |
|---|---|---|---|
|  | Payload adder per wireless transmitter | 04 | 4 sets of this message per day |

Meter Information Message - Uplink

| D | Field | Bytes | Notes |
|---|---|---|---|
|  | COSEM OBIS Code |  | standardized OBIS identifier |
|  | ID of wireless transmitter |  | Based on W-Mbus standard address |
|  | Message Timestamp |  | Time of the message transmission. Assume w-mbus coding. |
|  | Avg signal level from received cmd for DC 1 |  | Average RSSI from the Primary DC |
|  | Avg signal level from received cmd for DC 2 |  | Average RSSI from the Secondary DC |
|  | Avg signal level from received cmd for DC 3 |  | Average RSSI from the Tertiary DC |
|  | DC ID #1 |  | ID of the Primary DC |
|  | DC ID #2 |  | ID of the Secondary DC |
|  | DC ID #3 |  | ID of the Tertiary DC |
| 0 | Hardware revision |  | Hardware revisions on the wireless module |
| 1 | "C" firmware version |  | Firmware version of the wireless module |
| 2 | "M" firmware version |  | Firmware version of the metering point (metrology) |
| 3 | Extended diagnostic information |  | Special status and condition codes. |
|  | Payload adder per wireless transmitter | 4 |  |

Read Quality Data (For LAN Management) - Uplink

| D | Field | Bytes | Notes |
|---|---|---|---|
|  | COSEM OBIS Code |  | standardized OBIS identifier |
|  | ID of wireless transmitter |  | Based on W-Mbus standard address |
|  | RSSI Peak |  | Peak RSSI signal received over last 24 hours in dBm |
|  | RSSI Average |  | Average RSSI signal received over last 24 hours in dBm |
|  | Packet Count over last 24 Hours |  | Number of transmissions received form the metering module in the last 24 hours |
|  | Payload adder per wireless transmitter | 5 |  |

Channel Quality Data (For LAN Management) - Uplink

| D | Field | Bytes | Notes |
|---|---|---|---|
|  | COSEM OBIS Code |  | standardized OBIS identifier |
|  | ID of the DC |  | Based on W-Mbus standard address |
|  | Channel ID (1) |  | ID of the specific RF channel the statistical re for (1-6) |
|  | RSSI - Minimum |  | Minimum RSSI signal received in the quiet period (02:00:00 to 06:00:00) |
|  | RSSI Average |  | Average RSSI signal received over last 24 hours in dBm |
|  | RSSI Peak |  | Average RSSI signal received over last 24 hours in dBm |
|  | Good Packet Count |  | Number of good LAN packets received and decoded |
|  | Bad Packet Count |  | Number of LAN packets received that failed CRC check. |
|  | FFT Spectrum data |  | Channel RF spectrum measurement |
| 0 | ID of the DC |  | Based on W-Mbus standard address |
| 1 | Channel ID (2) |  | ID of the specific RF channel the statistics are for (1-6) |

| Channel Quality Data (For LAN Management) - Uplink | | | |
|---|---|---|---|
| ID | Field | Bytes | Notes |
| 2 | RSSI - Minimum | | Minimum RSSI signal received in the quiet period (02:00:00 to 06:00:00) |
| 3 | RSSI Average | | Average RSSI signal received over last 24 hours in dBm |
| 4 | RSSI Peak | | Average RSSI signal received over last 24 hours in dBm |
| 5 | Good Packet Count | | Number of good LAN packets received and decoded |
| 6 | Bad Packet Count | | Number of LAN packets received that failed CRC check. |
| 7 | FFT Spectrum data | | Channel RF spectrum measurement |
| 8 | Channel ID (3) | | ID of the specific RF channel the statistics are for (1-6) |
| 9 | RSSI - Minimum | | Minimum RSSI signal received in the quiet period (02:00:00 to 06:00:00) |
| 0 | RSSI Average | | Average RSSI signal received over last 24 hours in dBm |
| 1 | RSSI Peak | | Average RSSI signal received over last 24 hours in dBm |
| 2 | Good Packet Count | | Number of good LAN packets received and decoded |
| 3 | Bad Packet Count | | Number of LAN packets received that failed CRC check. |
| 4 | FFT Spectrum data | | Channel RF spectrum measurement |
| 5 | ID of the DC | | Based on W-Mbus standard address |
| 6 | Channel ID (4) | | ID of the specific RF channel the statistics are for (1-6) |
| 7 | RSSI - Minimum | | Minimum RSSI signal received in the quiet period (02:00:00 to 06:00:00) |
| 8 | RSSI Average | | Average RSSI signal received over last 24 hours in dBm |
| 9 | RSSI Peak | | Average RSSI signal received over last 24 hours in dBm |
| 0 | Good Packet Count | | Number of good LAN packets received and decoded |
| 1 | Bad Packet Count | | Number of LAN packets received that failed CRC check. |
| 2 | FFT Spectrum data | | Channel RF spectrum measurement |
| 3 | Channel ID (5) | | ID of the specific RF channel the statistics are for (1-6) |
| 4 | RSSI - Minimum | | Minimum RSSI signal received in the quiet period (02:00:00 to 06:00:00) |
| 5 | RSSI Average | | Average RSSI signal received over last 24 hours in dBm |
| 6 | RSSI Peak | | Average RSSI signal received over last 24 hours in dBm |
| 7 | Good Packet Count | | Number of good LAN packets received and decoded |
| 8 | Bad Packet Count | | Number of LAN packets received that failed CRC check. |
| 9 | FFT Spectrum data | | Channel RF spectrum measurement |
| 0 | ID of the DC | | Based on W-Mbus standard address |
| 1 | Channel ID (6) | | ID of the specific RF channel the statistics are for (1-6) |
| 2 | RSSI - Minimum | | Minimum RSSI signal received in the quiet period (02:00:00 to 06:00:00) |
| 3 | RSSI Average | | Average RSSI signal received over last 24 hours in dBm |
| 4 | RSSI Peak | | Average RSSI signal received over last 24 hours in dBm |
| 5 | Good Packet Count | | Number of good LAN packets received and decoded |
| 6 | Bad Packet Count | | Number of LAN packets received that failed CRC check. |
| 7 | FFT Spectrum data | | Channel RF spectrum measurement |
| | Payload adder per DC | 26 | |

| Performance Quality Data (For DC Management) - Uplink See SOL-FONC051 | | | |
|---|---|---|---|
| ID | Field | Bytes | Notes |
| | COSEM OBIS Code | | standardized OBIS identifier |
| | ID of the DC | | Based on W-Mbus standard address |
| | RAM Usage | | Min/max/average over the reporting period |
| | Storage | | Total, available, occupied |
| | Processor Utilization | | Min/max/average over the reporting period |
| | Batter Condition | | State of charge |
| | Number of restarts | | cold boots since last report |
| | Clock | | Synchronization offset and clock state |
| | Cabinet Alarm Conditions | | Door open closed, temp alarm and etc. |
| 0 | Local I/F Programming | | Local access counters |
| 1 | Data Security | | Attempted attack counters |
| 2 | Primary power Source and status | | Is AC present, when was last power failure |
| 3 | AC or Solar power | | Status and Voltage |
| 4 | LAN Modem status and failure data | 5 | Status log since last upload |
| 5 | DC Intra-box connectivity | | Status of connectivity between CPU, LAN modem and WAN Modems |
| 6 | WAN Modem statistics and failure data | 0 | RX signal strength, packets in/out, average throughput |
| 7 | Baseline DC configuration Information | 5 | Firmware version, HW version, last firmware update date, Operational parameters |
| 8 | LAN Configuration data | 2 | LAN Modem information, HW/SW version of LAN modem |
| 9 | WAN Modem Configuration Data | 5 | WAN Modem information, HW/SW version of LAN modem |
| 0 | WAN Modem status and Failure data | 5 | |
| | Payload adder per DC | 40 | |

| DC Alarm Message - Uplink | | |
|---|---|---|
| Field | Bytes | Notes |
| COSEM OBIS Code | | standardized OBIS identifier |
| ID of DC | | Based on W-Mbus standard address |
| Alarm Code | | Specific Alarm Code Identifier |
| Alarm Priority | | Urgent, Critical, Major, Minor, Informational |
| Alarm Data | 5 | Format based on Alarm code. |
| Payload adder per wireless transmitter | 0 | |

| DC Configuration Data (For DC Management) - Downlink See SOL-FONC039 | | |
|---|---|---|
| Field | Bytes | Notes |
| COSEM OBIS Code | | standardized OBIS identifier |
| ID of the DC | | Based on W-Mbus standard address |
| Alarm Priority | 0 | |
| Call In Schedule | 00 | |
| Collector Radio Configuration Parameters | 0 | |
| Diagnostic Portal Configuration | 5 | |
| Device Lifetime Filter | 0 | |
| NTP Source | 2 | |
| Outage Debounce | | |
| Phantom metering point Filter | 0 | |
| Certificates | 50 | |
| URM Configuration | 25 | |
| Endpoint Type Exclusion | 0 | |
| Payload adder per DC | 70 | |

| DC Configuration Data (For DC Operation) - Downlink See SOL-FONC039 | | |
|---|---|---|
| Field | Bytes | Notes |
| COSEM OBIS Code | | standardized OBIS identifier |
| ID of the DC | | Based on W-Mbus standard address |
| Management List | | |
| Report List | | |
| Key List | 6 | |
| Payload adder per wireless transmitter | 0 | |

| Key Exchange Command - Downlink | | |
|---|---|---|
| Field | Bytes | Notes |
| ID of wireless transmitter | | Based on W-Mbus standard address |
| COSEM OBIS Code | | standardized OBIS identifier |
| Message Timestamp | | Time of the message transmission. |
| Security Field | | Secure Authentication Data a |
| Reading Key | 6 | New reading key - 128 Bit AES |
| Command Key | 6 | New command key - 128 Bit AES |
| Recovery Key | 6 | New Recovery key - 128 Bit AES |
| Key Index | | Index of the Reading, Command, and Recovery keys. 1 byte each. |
| Tracking ID | | Tracking ID for replay attack prevention. |
| Payload adder per wireless transmitter | 5 | |

| Programming/Configuration Command - Downlink | | |
|---|---|---|
| Field | Bytes | Notes |
| ID of wireless transmitter | | Based on W-Mbus standard address |
| COSEM OBIS Code | | standardized OBIS identifier |
| Message Timestamp | | Time of the message transmission. |
| Security Field | | Secure Authentication Data |
| Number of Commands | | Number of commands to follow (1 to 9) |
| Command 1 | | Specific Command Identifier |
| Command 1 Data | | 4 Byte data field for the preceding command identifier |
| Command 2 | | Specific Command Identifier |
| Command 2 Data | | 4 Byte data field for the preceding command identifier |
| Command 3 | | Specific Command Identifier |
| Command 3 Data | | 4 Byte data field for the preceding command identifier |
| Command 4 | | Specific Command Identifier |
| Command 4 Data | | 4 Byte data field for the preceding command identifier |
| Command 5 | | Specific Command Identifier |
| Command 5 Data | | 4 Byte data field for the preceding command identifier |
| Command 6 | | Specific Command Identifier |
| Command 6 Data | | 4 Byte data field for the preceding command identifier |
| Command 7 | | Specific Command Identifier |
| Command 7 Data | | 4 Byte data field for the preceding command identifier |
| Command 8 | | Specific Command Identifier |
| Command 8 Data | | 4 Byte data field for the preceding command identifier |
| Command 9 | | Specific Command Identifier |
| Command 9 Data | | 4 Byte data field for the preceding command identifier |
| Tracking ID | | Tracking ID for replay attack prevention. |
| Payload adder per wireless transmitter | 9 | |

| Wireless Module Firmware Download Block - Downlink | | |
|---|---|---|
| Field | Bytes | Notes |
| ID of wireless transmitter Multicast Group | | Multicast address for FW download on the LAN |
| COSEM OBIS Code | | standardized OBIS identifier |
| Message Timestamp | | Time of the message transmission. |
| Security Field | | Secure Authentication Data |
| Total Packets in Download | | Total Number of Packets in the entire firmware image |
| Packet Number | | Specific Packet number in the download |
| FW Block | 00 | 100 Byte block of the firmware image. |
| Tracking ID | | Tracking ID for replay attack prevention. |
| Payload adder per Multicast Group | 28 | Must multiply by FW size --- Typically × 1000 packets for a comms image. |

| DC Software Download Multicast - Downlink | | |
|---|---|---|
| Field | Bytes | Notes |
| ID of wireless transmitter Multicast Group | | Multicast address for FW download on the LAN |

-continued

DC Software Download Multicast - Downlink

| D | Field | Bytes | Notes |
|---|---|---|---|
| | COSEM OBIS Code | | standardized OBIS identifier |
| | Message Timestamp | | Time of the message transmission. |
| | Security Field | | Secure Authentication Data |
| | Total Packets in Download | | Total Number of Packets in the entire firmware image |
| | Packet Number | | Specific Packet number in the download |
| | FW Block | 0000 | 10,000 Byte block of the firmware image. |
| | Tracking ID | | Tracking ID for replay attack prevention. |
| Payload adder per Multicast Group | | 0028 | Must multiply by FW size --- Typically × 3000 packets for a comms image × 5 tries |

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A data collector for use within an advanced metering infrastructure (AMI) configured for automatic meter reading (AMR) and for management of companion specification for energy metering (COSEM) objects, the data collector comprising:
   a class object library manager, configured to receive and store at least one class object associated with at least one endpoint;
   a data manager, configured to process raw data obtained from the at least one endpoint; and
   a COSEM object manager, configured to create at least one COSEM object according to:
      a class object from among the at least one class object; and
      the processed raw data;
   wherein the created COSEM object includes tags indicated by the at least one class object and not received with the raw data.

2. The data collector as recited in claim 1, wherein:
   the data manager is additionally configured to translate differential data obtained from among the processed raw data into a full register read associated with a particular endpoint.

3. The data collector as recited in claim 1, wherein:
   the class object library manager is additionally configured to receive a plurality of class objects to define a plurality of profiles of a plurality of endpoints, respectively, and to associate each of the plurality of class objects with a respective one of the plurality of endpoints.

4. The data collector as recited in claim 1, wherein:
   the data manager is additionally configured to receive raw data from a plurality of endpoints, the raw data configured as a compact array comprising an indication of an associated object identification system (OBIS) code;
   wherein the compact array is interpreted with respect to the class object to configure the COSEM object.

5. The data collector as recited in claim 1, wherein:
   the data manager is additionally configured to receive data organized as a compact array, wherein portions of the data are organized without tags;
   wherein the received and stored class object is configured for use in mapping the data organized as the compact array into the at least one COSEM object.

6. The data collector as recited in claim 1, wherein:
   the raw data comprises a compact array with an indication of an associated OBIS code and a plurality of subfields not delineated by tags; and
   the COSEM object manager is additionally configured to create the at least one COSEM object by:
      selecting the class object from among the stored at least one class object, wherein the selected class object is associated with an endpoint from which the raw data was received; and
      using the selected class object and the compact array to configure the at least one COSEM object.

7. A system comprising the data collector as recited in claim 1 and an endpoint, the endpoint comprising:
   a class object manager, configured to upload a class object for receipt and storage by the class object library manager; and
   a raw data manager, configured to obtain meter data at intervals and to configure the meter data as raw data for transmission to the data manager.

8. The system of claim 7, wherein the raw data manager is additionally configured to:
   obtain differential data regarding incremental increases in resource consumption; and
   create a compact array with the differential data for transmission to the data manager.

9. A method for communication within an automatic meter reading (AMR) environment and for utilization of companion specification for energy metering (COSEM) objects, the method comprising:
   under control of a device executing the method according to a sequence of steps that include:
      receiving a class object;
      receiving raw data; and
      configuring at least one COSEM object according to the received class object and the received raw data, wherein the configured COSEM object includes tags which are indicated by the class object and not received with the raw data.

10. The method as recited in claim 9, wherein:
    receiving the raw data comprises receiving differential data that represents differential changes to full register reads at an endpoint; and
    configuring the at least one COSEM object comprises translating the differential data into an equivalent of a full register read based in part on processing with endpoint register data stored at a data collector.

11. The method as recited in claim 9, additionally comprising:
    receiving a plurality of class objects to define a plurality of profiles of a plurality of endpoints, respectively;
    configuring a plurality of COSEM objects based on the plurality of class objects and raw data from the plurality of endpoints, respectively; and
    providing the plurality of COSEM objects to a head office.

12. The method as recited in claim 9, additionally comprising:
    requesting particular data from an endpoint;
    recognizing the received raw data as a substitute for the particular data; and accepting the received raw data as the substitute for the particular data.

13. The method as recited in claim 9, wherein receiving the raw data comprises:
    receiving a compact array comprising an indication of an associated OBIS code;
    wherein the compact array is interpreted with respect to the class object to configure the COSEM object.

14. The method as recited in claim 9, wherein receiving the raw data comprises:
    receiving data organized as a compact array, wherein portions of the data are organized without tags;
    wherein the received class object is configured for use in mapping the data in the compact array into the at least one COSEM object.

15. The method as recited in claim 9, wherein:
    the raw data comprises a compact array with an indication of an associated OBIS code and a plurality of subfields not delineated by tags; and
    configuring at least one COSEM object comprises selecting a class object associated with an endpoint from which the raw data was received and using the selected class object to configure the at least one COSEM object.

16. A system, comprising:
    an endpoint for use within an advanced metering infrastructure (AMI) configured for automatic meter reading (AMR), the endpoint comprising:
        a meter;
        a class object manager, configured to upload a class object for receipt and storage by a data collector, the class object configured for repeated creation of companion specification for energy metering (COSEM) objects; and
        a raw data manager, configured to:
            obtain meter data at intervals; and
            configure the meter data as raw data for transmission to the data collector;
    wherein the data collector is configured for utilization of COSEM objects and for:
        receiving the class object from the endpoint;
        receiving the raw data from the endpoint; and
        configuring at least one COSEM object according to the received class object and the received raw data, wherein the configured COSEM object includes tags which are indicated by the class object and not received with the raw data.

17. The system as recited in claim 16, wherein the raw data is configured as a compact array, the compact array comprising:
    an indication of an object identification system (OBIS) code;
    wherein the compact array, when interpreted with respect to the class object, includes sufficient information to create appropriate tags needed within a COSEM object.

18. The system as recited in claim 16, wherein the raw data comprises:
    a compact array having an indication of an OBIS code, wherein portions of the compact array are organized without tags.

19. The system as recited in claim 16, wherein the raw data is configured as a compact array, the compact array comprising:
    an indication of an OBIS code; and
    a plurality of subfields not delineated by tags;
    wherein data in the compact array includes information sufficient to configure at least one COSEM object when interpreted using the class object.

20. A system, comprising:
    an endpoint for use within an advanced metering infrastructure (AMI) configured for automatic meter reading (AMR), the endpoint comprising:
        a meter;
        a class object manager, configured to upload a class object for receipt and storage by a data collector, the class object configured for repeated creation of companion specification for energy metering (COSEM) objects; and
        a raw data manager, configured to:
            obtain meter data at intervals; and
            configure the meter data as raw data for transmission to the data collector; and
    a data collector, in communication with the endpoint, the data collector comprising:
        a class object library manager, configured to receive and store at least one class object associated with the endpoint;
        a data manager, configured to:
            process raw data obtained from a plurality of endpoints; and
            translate differential data obtained from among the processed raw data into a full register read associated with a particular endpoint; and
        a COSEM object manager, configured to create at least one COSEM object according to:
            a stored class object from among the at least one stored class objects; and
            raw data from the data manager;
        wherein the created COSEM object includes tags indicated by the class object and not received with the raw data.

* * * * *